US012806721B2

(12) United States Patent
Kimura

(10) Patent No.: US 12,806,721 B2
(45) Date of Patent: Nov. 24, 2026

(54) REMOVAL METHOD OF WELD BEAD

(71) Applicant: TOYOTA JIDOSHA KABUSHIKI KAISHA, Toyota (JP)

(72) Inventor: Ryo Kimura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 577 days.

(21) Appl. No.: 18/472,884

(22) Filed: Sep. 22, 2023

(65) Prior Publication Data

US 2024/0207984 A1 Jun. 27, 2024

(30) Foreign Application Priority Data

Dec. 27, 2022 (JP) ................................ 2022-209333

(51) Int. Cl.
*B23K 37/08* (2006.01)

(52) U.S. Cl.
CPC .................................... *B23K 37/08* (2013.01)

(58) Field of Classification Search
CPC ...................................................... B23K 37/08
See application file for complete search history.

(56) References Cited

U.S. PATENT DOCUMENTS

| | | | | |
|---|---|---|---|---|
| 6,049,060 A * | 4/2000 | Smashey | B23P 6/04 | 228/119 |
| 2008/0185420 A1 * | 8/2008 | Swallow | B23K 37/08 | 228/19 |
| 2009/0001065 A1 * | 1/2009 | Ladru | B23K 37/06 | 219/136 |
| 2015/0102017 A1 * | 4/2015 | Roussarie | B23K 26/702 | 219/76.14 |
| 2019/0061080 A1 * | 2/2019 | Gullotta | B08B 15/04 | |

FOREIGN PATENT DOCUMENTS

| | | | |
|---|---|---|---|
| CN | 106736228 A * | 5/2017 | B23D 79/021 |
| JP | 2019206023 A * | 12/2019 | |
| JP | 2020-124782 A | 8/2020 | |

OTHER PUBLICATIONS

CN 106737228 (Year: 2017).*
JP 2019206023 translation (Year: 2019).*

* cited by examiner

*Primary Examiner* — Woody A Lee, Jr.
(74) *Attorney, Agent, or Firm* — SoraIP, Inc.

(57) ABSTRACT

The method for removing a weld bead includes (a) the steps of preparing a scraper having a higher melting point than the melting points of the base metal and the welding rod; (b) heating the base metal and the welding rod to a temperature lower than the melting points of the scrapers to form a molten pool in which the base metal and the welding rod are fused together; (d) moving the at least part along a second surface of the scraper opposite to the first surface facing the base material, thereby discharging the at least part backward, opposite to the forward movement direction of the scraper in step (c).

4 Claims, 10 Drawing Sheets

REMOVAL METHOD OF WELD BEAD

CROSS-REFERENCE TO RELATED APPLICATION

This application claims priority to Japanese Patent Application No. 2022-209333 filed on Dec. 27, 2022, incorporated herein by reference in its entirety.

BACKGROUND

1. Technical Field

The present disclosure relates to a removal method of a weld bead.

2. Description of Related Art

As a technology for removing beads generated by welding, for example, a removal method using a cutting tool is known, as described in Japanese Unexamined Patent Application Publication No. 2020-124782 (JP 2020-124782 A). The removal method disclosed in JP 2020-124782 A is a method of scraping off unnecessary beads with the cutting tool, in a state in which the beads are solidified after welding.

Bead removal is commonly performed with a rotary cutting tool. Specifically, an end mill is used as the cutting tool. In this bead removal, removed beads may become adhered to the cutting tool when removing the solidified beads.

SUMMARY

The rotary cutting tool requires driving equipment to rotate the cutting tool. Moreover, the rotary cutting tool causes chips to scatter all around due to cutting beads while rotating. The scattered chips need to be collected for material recycling. Accordingly, the scattering of chips makes the bead removal work including recovery troublesome.

Also, in the above technology, it is necessary to wait for solidification of the beads, resulting in a long product cycle time. Moreover, the lower the temperature of the beads, which is mainly made of aluminum, soft iron, or the like, the more likely adhesion to the cutting tool during removal is to occur. Accordingly, the cutting tool is sprayed with a coolant liquid during the bead removal work, thereby necessitating an additional operation to suppress adhesion.

Hence, there has been demand for a technology that can remove beads in a molten state without prolonging the cycle time and without requiring suppression of adhesion. Furthermore, with respect to this removal technology, a technology using a cutting tool that does not require driving equipment and that does not scatter chips has been desired.

The present disclosure can be realized as the following forms.

(1) According to one aspect of the present disclosure, a removal method of a weld bead is provided. This removal method includes the steps of: (a) preparing a scraper made of a material with a melting point that is higher than a melting point of a base material that is an object of welding and a melting point of a welding rod; (b) creating a molten pool in which the base material and the welding rod are fused together, by heating the base material and the welding rod at a temperature lower than the melting point of the scraper; (c) separating at least a portion of material making up an elevated portion by the scraper, by moving the scraper to the elevated portion of the bead that is raised from the molten pool above a surface of the base material while the molten pool is molten; and (d) discharging the at least a portion of the material rearward, in a direction opposite to forward that is a direction of movement of the scraper in the step (c), by causing the at least a portion of the material to move along a second face of the scraper on a side opposite to a first face facing the base material.

According to such a form, the cycle time can be shortened as compared with a form of removing the elevated portion after the bead cools down. Furthermore, the elevated portion can be removed from the base material without rotating the cutting tool. Thus, the elevated portion separated from the base material can be removed without scattering. Further, the elevated portions separated from the base material are discharged rearward from the scraper. Accordingly, recovery of the elevated portions is easier as compared with when the elevated portions separated from the base material are scattered around.

(2) In the removal method of the above aspect, the scraper may further include a third face disposed on the opposite side from the first face. A rearward edge of the second face may be disposed upward and rearward as compared to a forward edge of the third face, in an attitude of the scraper at a time of the movement. The step (d) may include solidifying the at least a portion of the material that flows over the scraper by the movement of the scraper, in an area that is rearward of the rearward edge of the second face, and upward from the third face. According to such a form, the elevated portion in the molten state can be solidified on the scraper. That is to say, the removed beads can be collected at a lower temperature than the temperature of elevated portions in the molten state. Accordingly, there are no temperature restrictions, and recovery can be easily performed, as compared with when recovering the elevated portions in the molten state. Furthermore, the elevated portions are removed at a higher temperature than the temperature when recovering the elevated portion in a solidified state, and accordingly adhesion between the scraper and the elevated portions is less likely to occur. That is to say, adhesion suppression work can be reduced.

(3) The removal method of the above aspect may further include (e) recovering the at least a portion of the material as discharged removed material, following the step (d), by a recovery unit that the scraper includes and is provided rearward of the second face, to recover the removed material that is removed by the scraper.

According to such a form, the removed elevated portions can be recovered by the scraper. Thus, the risk of the removed elevated portions falling onto the base material or the like can be reduced.

(4) In the removal method of the above aspect, the scraper may include a protrusion that protrudes from the first face. The step (c) may include leveling unevenness on a surface of the molten pool from which the material is separated, by abutting a distal end of the protrusion against the surface of the base material.

According to such a form, surface roughness of the bead after bead removal can be reduced.

(5) In the removal method of the above aspect, the welding may be welding for manufacturing a battery.

Usage in welding for manufacturing batteries enables defects due to interference between weld beads and parts to be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

A1. Device Configuration

Figure 1:
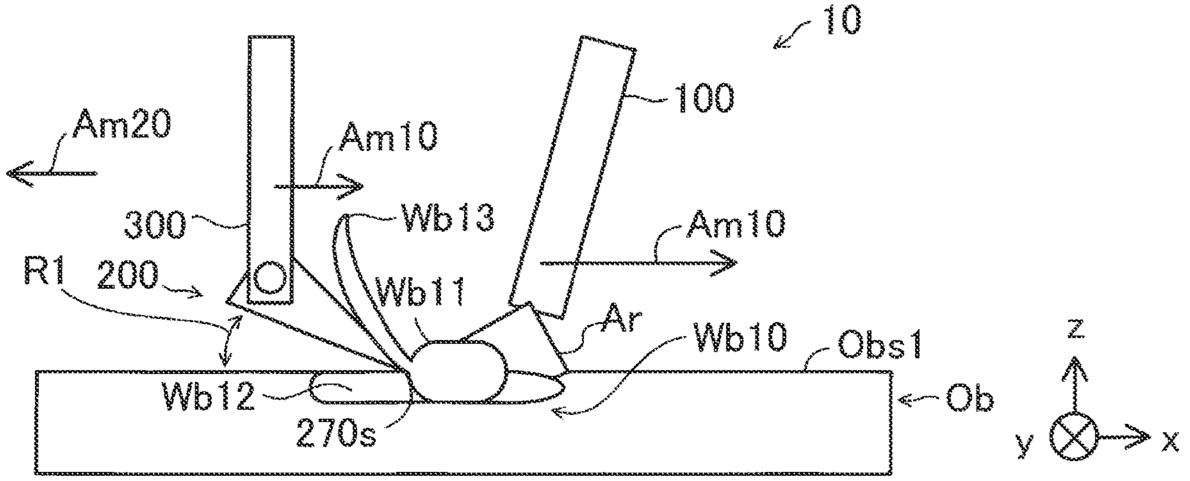
FIG. 1 is an explanatory diagram showing the device configuration for removing a weld bead.

FIG. 1 is an explanatory diagram showing a device configuration for removing a weld bead as a first embodiment of the present disclosure. In the following description, the z-axis direction is the vertical direction. The x-axis direction is the direction of arrow AM10, which is the bead removal direction. The direction of arrow AM10 will be described later in detail. The y-axis direction is a direction orthogonal to the z-axis and the x-axis.

The device 10 shown in FIG. 1 performs welding of the base material Ob and removal of the bead by welding. Welding by device 10 is consumable electrode welding. Specifically, it is MIG welding. In the welding of the device 10, the base material Ob is aluminum, for example. The melting point Tm1 of the base material Ob is approximately 660° C. when the material is aluminum. Device 10 includes welding rod 100, scraper 200 and support portion 300.

Base material Ob and welding rod 100 are heated at temperature Tm4 lower than melting point Tm3 of scraper 200. Thereby, a molten pool Wb10 is generated in which the base material Ob and the welding rod 100 are fused together. More specifically, the base material Ob and the welding rod 100 itself are melted by arc discharge Ar to generate a molten pool Wb10 on the base material Ob. That is, arc welding is performed by joining the base material Ob and the welding rod 100 itself by melting with arc discharge Ar. Welding rod 100 is delivered toward the base material as welding progresses. The welding rod 100 is, for example, aluminum alloy A5183 in JISZ3232. The melting point Tm2 of this welding rod 100 is about 660° C. The scraper 200, which will be described later, has a melting point Tm3 of about 3387° C. A heating temperature Tm4 for arc welding is a temperature between the melting point Tm2 and the melting point Tm3. For example, the temperature Tm4 of heating by arc welding is about 2500° C. Welding rod 100 is the torch of a welding robot. The welding rod 100 generates an arc discharge Ar from a welding machine of a welding robot. Welding rod 100 is movable during welding by a robot arm of a welding robot. In order to facilitate understanding of the technology, illustration of the welding machine and the robot arm is omitted in FIG. 1. The moving direction of welding is called the direction of arrow AM10 in FIG. 1.

The elevated portion Wb11 is a portion raised from the molten pool Wb10 above the surface Obs1 of the base material Ob of the bead. The scraper 200 separates at least part of the material forming the elevated portion Wb11 from the base material Ob while the molten pool Wb10 is being melted. This function is exhibited by moving the scraper 200 while the molten pool Wb10 is being melted. This removed portion of material is referred to as removed material Wb13. Furthermore, the scraper 200 solidifies the removal material Wb13 flowing on the scraper 200 by moving the scraper 200. In addition, the scraper 200 discharges the material to be removed Wb13 toward the rearward Am20 opposite to the forward Am10, which is the direction in which the scraper 200 moves. This ejection is a relative motion as viewed from scraper 200. This discharge will be described in detail later. The moving direction Am10 of the scraper 200 moving in the forward direction Am10 is the same as the moving direction Am10 of the welding rod 100. In FIG. 1, the front Am10 is in the +x direction and the rear Am20 is in the −x direction.

Figure 2:
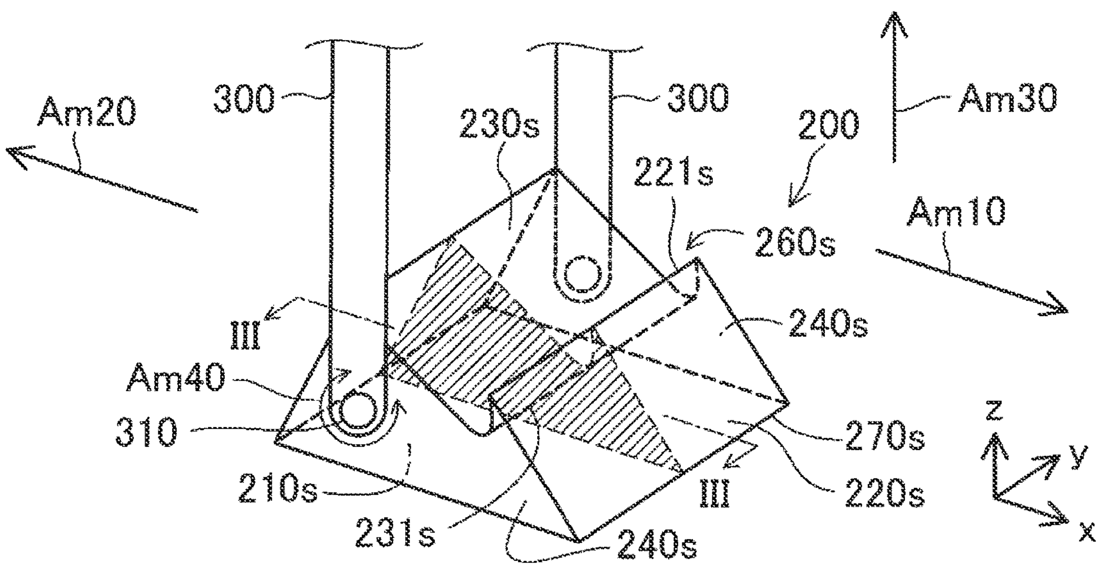
FIG. 2 is an explanatory diagram showing the shape of the scraper 200.

FIG. 2 is an explanatory diagram showing the shape of the scraper 200. The scraper 200 is made of a material having a melting point Tm3. For example, this material is tungsten. The melting point Tm3 is higher than the melting point Tm1 of the base material Ob to be welded and the melting point Tm2 of the welding rod 100. The melting point of tungsten is about 3387° C. Therefore, as described above, the melting point Tm3 is about 3387° C. The scraper 200 includes a first surface 210*s*, a second surface 220*s*, a third surface 230*s*, and fourth surfaces 240*s*.

The first surface 210*s* is the surface of the scraper 200 that faces the base material Ob when removing the bead. In FIG. 2, the direction facing the base material Ob is the −z direction. The second surface 220*s* and the third surface 230*s* are surfaces opposite to the first surface 210*s*. The second surface 220*s* and the third surface 230*s* are inclined in the −z direction from the rear Am20 of the scraper 200 toward the front Am10. The front end 270*s* of the scraper 200 is defined by the connecting portion of the first surface 210*s* and the second surface 220*s*. The second surface 220*s* comprises an edge 221*s* of the rear Am20 of the scraper 200. The third surface 230*s* comprises an edge 231*s* of the front Am10 of the scraper 200. The edge 221*s* of the rear Am20 of the second surface 220*s* is arranged above Am30 and the rear Am20 in the attitude during movement of the scraper 200 compared to the edge 231*s* of the front Am10 of the third surface 230*s*. As a result, a step 260*s* is formed on the surface opposite to the first surface 210*s* due to the height difference between the second surface 220*s* and the third surface 230*s*. Up Am30 is the +z direction in FIG. 2. The attitude during movement of the scraper 200 is the attitude during removal of the object to be removed Wb13. The attitude of scraper 200 in FIG. 2 represents the attitude during movement of scraper 200.

The fourth surfaces 240*s* are a pair of surfaces located on both sides of the first surface 210*s*, the second surface 220*s*, and the third surface 230*s*. That is, the fourth surfaces 240*s* are surfaces located on the left and right sides of the scraper 200 having the front Am10 and the rear Am20.

The support portion 300 supports the scraper 200, as shown in FIG. 2. More specifically, the support portion 300 supports the scraper 200 from both sides by being connected to the fourth surfaces 240*s* of the scraper 200. A connection portion with the scraper 200 is called connection portions 310. The support portion 300 is connected to the robot arm of the welding robot at the end opposite to the end supporting the scraper 200. That is, the support portion 300 is connected to the scraper 200 and the robot arm. With this configuration, the support portion 300 moves the scraper 200 in the moving direction Am10 of the welding rod 100 along with the welding movement of the robot arm. In order to facilitate understanding of the technology, illustration of the robot arm is omitted in FIG. 2. The support portion 300 receives heat from welding through the scraper 200. Therefore, the support portion 300 is made of a material having a melting point Tm3 in order to prevent melting. For example, the material of the support portion 300 is tungsten.

Additionally, the support portion 300 can be angled with respect to the scraper 200. As shown in FIG. 2, the support portion 300 can rotate the connection portions 310 with the scraper 200 in the arrow Am40 direction. Therefore, the support portion 300 can change the angle R1 of the scraper 200 with respect to the base material Ob by adjusting the angle with respect to the scraper 200. By adopting such a mode, as shown in FIG. 1, the support portion 300 can adjust an angle R1 at which the front end 270*s* of the scraper 200 is inserted into the base material Ob. That is, the support portion 300 can adjust the force required to separate the removal material Wb13 from the molten pool Wb10. This force is a vertically upward force from the surface Obs1 of the base material Ob. In FIG. 2, this force is in the +z direction. In addition, the support portion 300 can adjust the distance between the base material Ob and the front end 270*s* of the scraper 200 by adjusting the angle R1. That is, the support portion 300 can adjust the amount of the removal material Wb13 to be removed from the elevated portion Wb11.

A2. Weld Bead Removal

Figure 3:
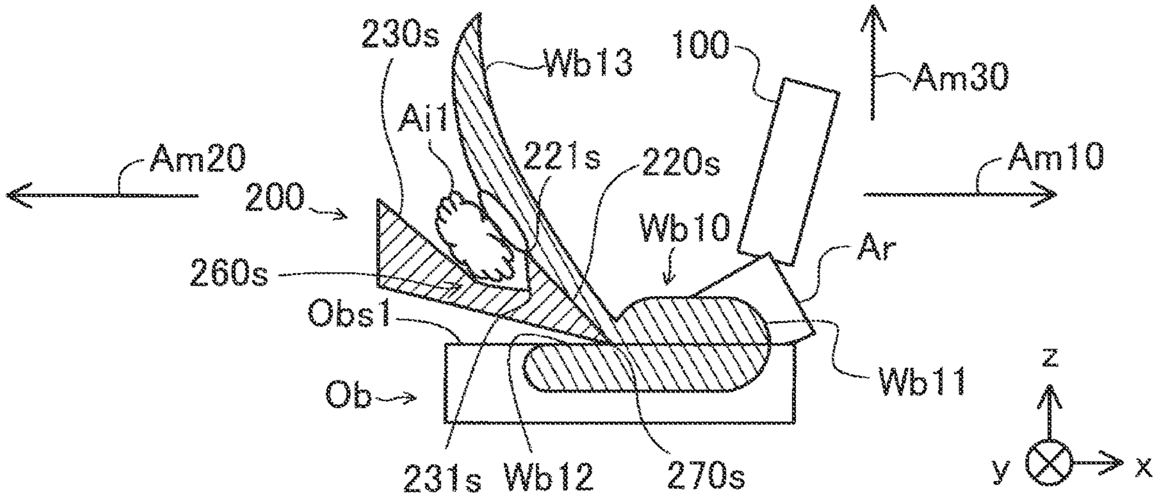
FIG. 3 is an illustration showing bead removal by the scraper 200.

FIG. 3 is an explanatory view showing bead removal by the scraper 200. FIG. 3 shows a section of the scraper 200 and the weld pool Wb10 located on the III-III section in FIG. 2. The molten pool Wb10 shown in FIG. 3 is in a state in which the removed material Wb13 is being melted by the arc welding of the welding rod 100. Scraper 200 moves in moving direction Am10 of welding rod 100 during this state. Therefore, the front end 270*s* of the scraper 200 enters the elevated portion Wb11 which rises above the surface Obs1 of the base material Ob. The scraper 200 separates the material to be removed Wb13 from the base material Ob. More specifically, the scraper 200 puts the removed material Wb13 on the second surface 220*s* by inserting the front end 270*s* into the elevated portion Wb11. The second surface 220*s* of the scraper 200 is inclined in the z direction from the rear Am20 of the scraper 200 toward the front Am10. Therefore, the scraper 200 relatively moves the material to be removed Wb13 rearward Am20 along the second surface 220*s* inclined in the −z direction. Thereby, the scraper 200 applies force in the +z direction to the object to be removed Wb13. Therefore, the scraper 200 removes the object to be removed Wb13.

As described above, the scraper 200 removes the material to be removed Wb13 by moving the material to be removed Wb13 relatively backward to Am20. This relative motion of the object to be removed Wb13 is performed by the scraper 200 moving forward Am10 with respect to the object to be removed Wb13. That is, this operation is not caused by applying a force toward the rearward Am20 to the object to be removed Wb13. In the following description, unless otherwise specified, the movement by the removed object Wb13 refers to the relative movement from the scraper 200.

A3. Weld Bead Solidification

As shown in FIG. 3, the removed material Wb13 flows on the scraper 200 as the scraper 200 moves. More specifically, the material to be removed Wb13 moves along the second surface 220*s* of the scraper 200. The removed object Wb13 reaches the step 260*s* by exceeding the edge 221*s* of the rear Am20 of the second surface 220*s*. Due to the step 260*s*, the removed object Wb13 reaches the space between the second surface 220*s* and the third surface 230*s*. The movement of the scraper 200 causes the air Ai1 to flow in this space. Therefore, the flow of this air Ai1 cools the scraper 200 and the removed material Wb13. This cooling is cooling by heat exchange between the removed material Wb13 and the air Ai1. Furthermore, this cooling is cooling due to heat exchange between the scraper 200 and the air Ai1, which is generated by thermal conduction of the heat of the removed material Wb13 to the scraper 200. Therefore, the removed material Wb13 is solidified at the rear Am20 of the edge 221*s* of the rear Am20 of the second surface 220*s* and the upper Am30 of the third surface 230*s*.

A4. Weld Bead Ejection

Figure 4:
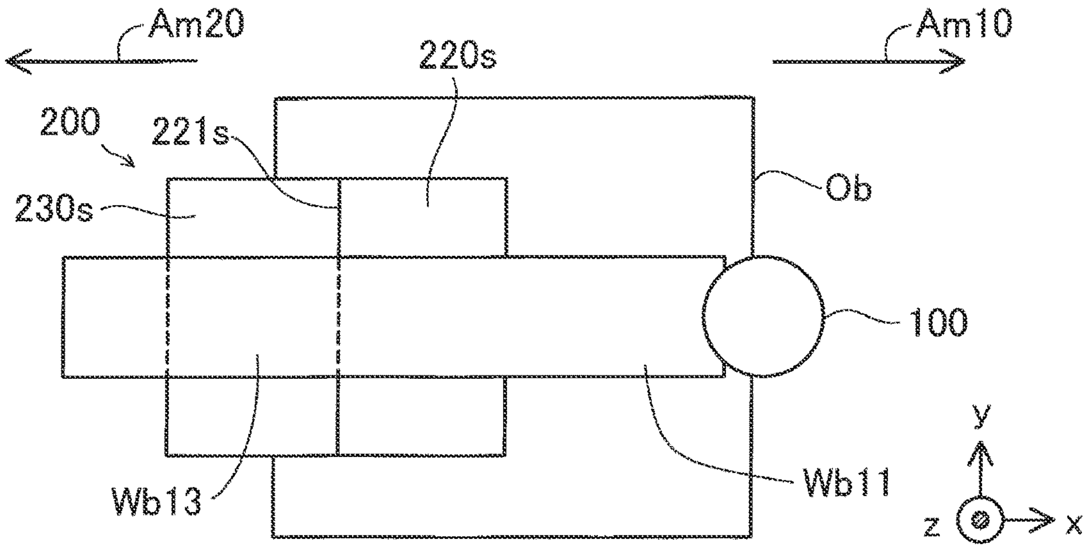
FIG. 4 is an explanatory diagram showing discharge of the removed material Wb13 by the scraper 200.

FIG. 4 is an explanatory diagram showing the discharge of the removed material Wb13 by the scraper 200. FIG. 4 shows the state of the scraper 200 when viewing FIG. 3 from the +z direction. As the scraper 200 moves, the removed material Wb13 moves along the second surface 220*s* toward the rearward Am20 opposite to the forward Am10, which is the direction in which the scraper 200 moves. Further, the removed material Wb13 is discharged from the rear Am20 of the scraper 200 by moving along the third surface 230*s*.

A5. Weld Bead Removal Method Steps

Figure 5:
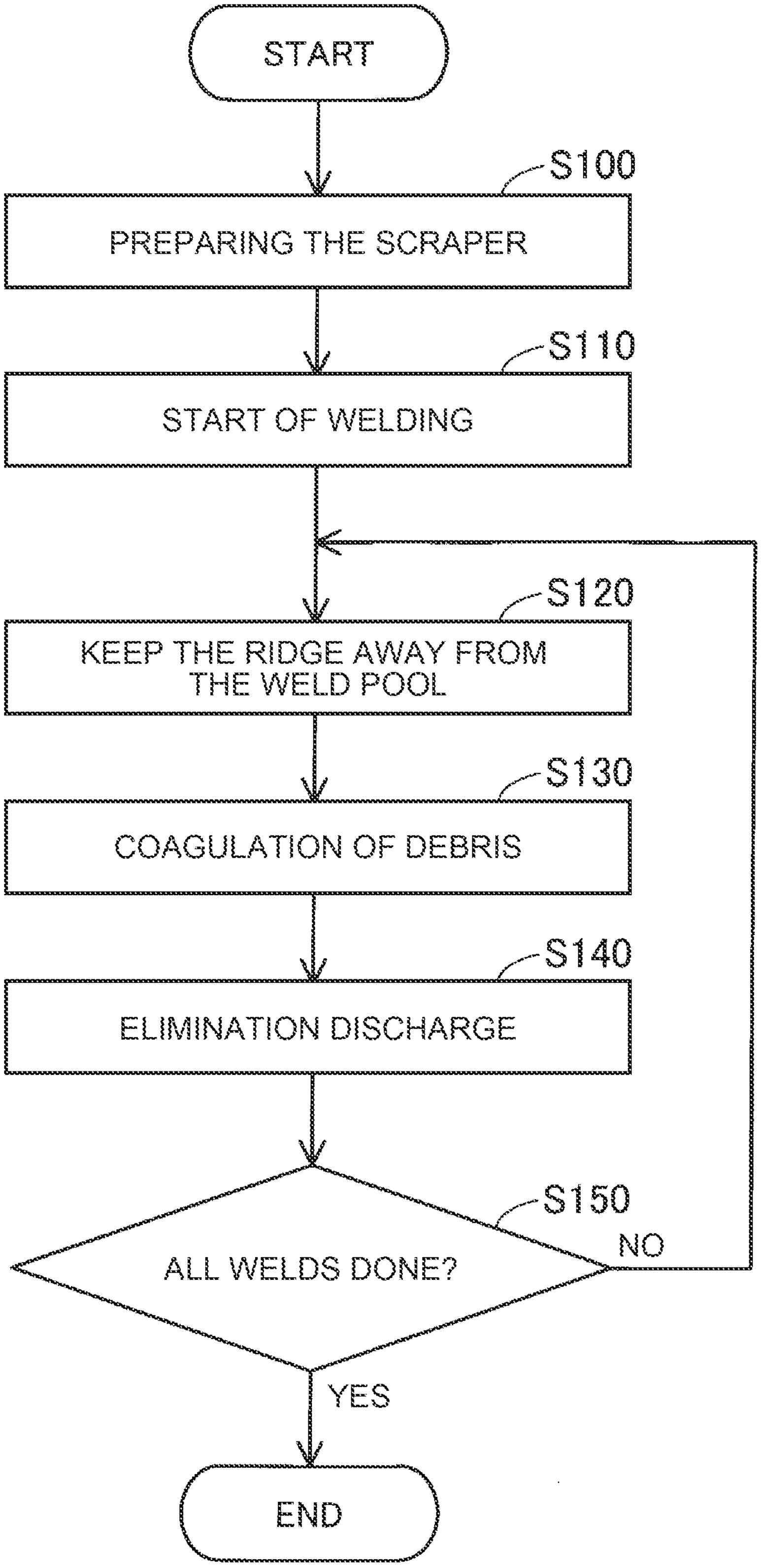
FIG. 5 is a flowchart showing the steps of a weld bead removal method.

FIG. 5 is a flowchart showing the steps of a weld bead removal method. In S100 of FIG. 5, the user prepares scraper 200 made of a material having melting point Tm3. The melting point Tm3 is higher than the melting point Tm1 of the base material Ob to be welded and the melting point Tm2 of the welding rod 100. That is, the scraper 200 can be used while the molten pool Wb10 is being melted by being attached to the device 10 as shown in FIG. 1.

In S110 of FIG. 5, the controller of the welding robot in the device 10 heats the base material Ob and the welding rod 100 to a temperature Tm4 lower than the scraper 200's melting point Tm3. As a result, a molten pool Wb10 in which the base material Ob and the welding rod 100 are fused together is generated. That is, the welding rod 100 starts welding the workpiece of the base material Ob.

Figure 6:
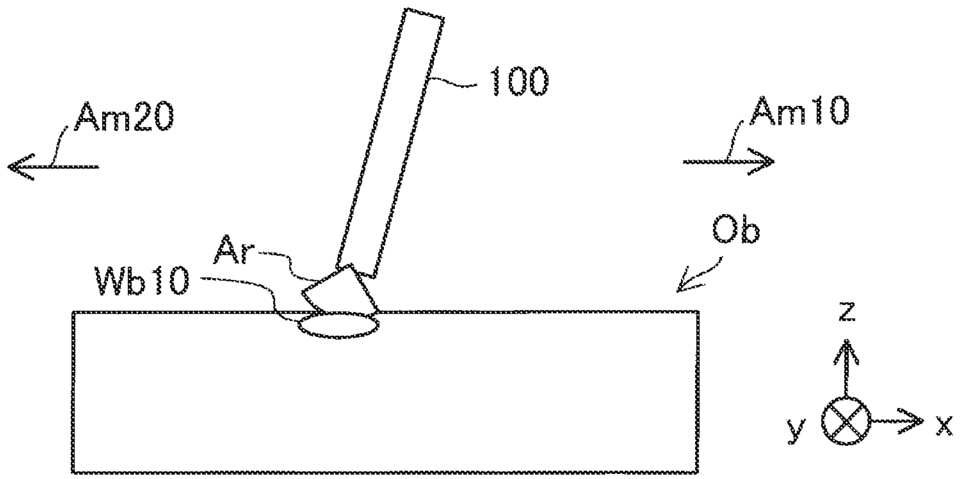
FIG. 6 is an explanatory diagram showing formation of a molten pool Wb10 by arc welding.

FIG. 6 is an explanatory diagram showing formation of a molten pool Wb10 by arc welding. The welding rod 100 melts the base material Ob and the welding rod 100 by performing arc discharge Ar on the base material Ob. Therefore, a weld pool Wb10 is generated on the base material Ob. In order to facilitate understanding of the technology, illustration of the scraper 200 and the support portion 300 is omitted in FIG. 6.

In S120 of FIG. 5, the scraper 200 separates the removed material Wb13 from the base material Ob by the scraper 200 while the molten pool Wb10 is being melted. This step is performed by moving the scraper 200 with respect to the elevated portion Wb11. The elevated portion Wb11 is a portion raised from the molten pool Wb10 above the surface Obs1 of the base material Ob of the bead.

Figure 7:
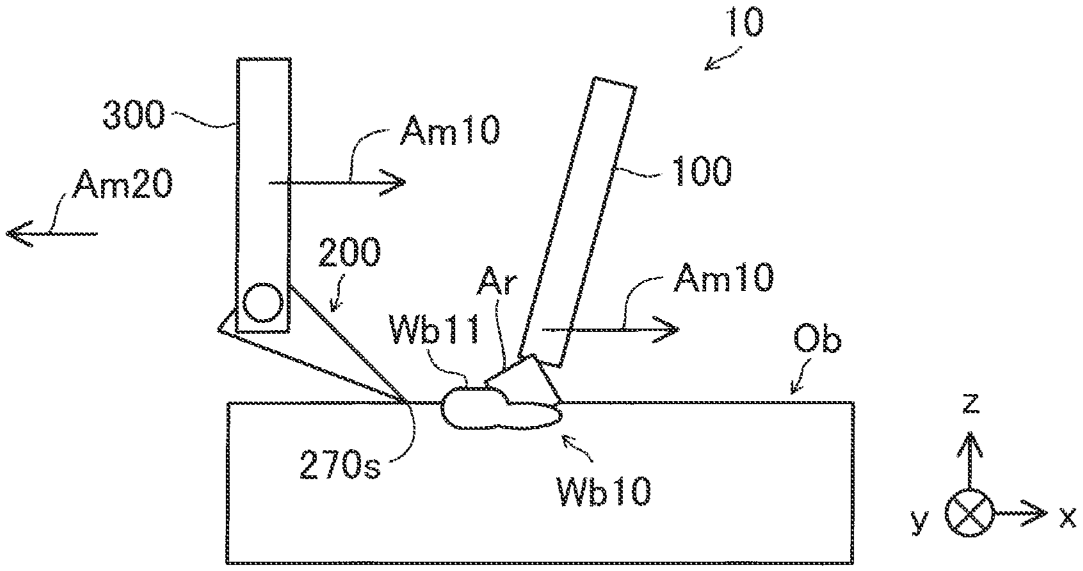
FIG. 7 is an explanatory diagram showing the scraper 200 moving toward the molten pool Wb10.

FIG. 7 is an explanatory diagram showing the scraper 200 moving toward the molten pool Wb10. The scraper 200 moves toward the molten pool Wb10 while keeping its front end 270*s* along the base material Ob. Then, as shown in FIG. 3, the scraper 200 removes the removal material Wb13 that becomes a bead from the molten pool Wb10.

In S130 of FIG. 5, the scraper 200 solidifies the removal material Wb13 flowing on the scraper 200 by moving the scraper 200. This coagulation, as shown in FIG. 3, is performed at the rear Am20 of the edge 221*s* of the rear Am20 of the second surface 220*s* and the upper Am30 of the third surface 230*s*.

At S140 in FIG. 5, the scraper 200 discharges the removal material Wb13 toward the rear Am20. The backward Am20 is the direction opposite to the forward Am10, which is the direction in which the scraper 200 moves the object to be removed Wb13. As shown in FIG. 4, this discharge is performed by moving the removed material Wb13 along the second surface 220*s* of the scraper 200 opposite to the first surface 210*s* facing the base material Ob. Although S120 to S140 have been described individually for easy understanding of the technique, in actual welding, S120 to S140 are performed in parallel on Wb10 of different parts of the base material.

In S150 of FIG. 5, the control section of the welding robot confirms the remaining processing objects. This welding robot is a welding robot with a welding rod 100. If there are remaining parts to be processed, the controller of the welding robot advances the process to S120 to continue welding. If there are no remaining objects to be processed, the controller of the welding robot ends welding. The scraper 200 advances in the moving direction Am10 of the welding rod 100 while the molten pool Wb10 is being melted. Therefore, the scraper 200 moves until there is no remaining molten pool Wb10 that has not finished removing the material to be removed Wb13. Therefore, removal of the bead ends when the molten pool Wb10 disappears due to the end of welding.

Figure 8:
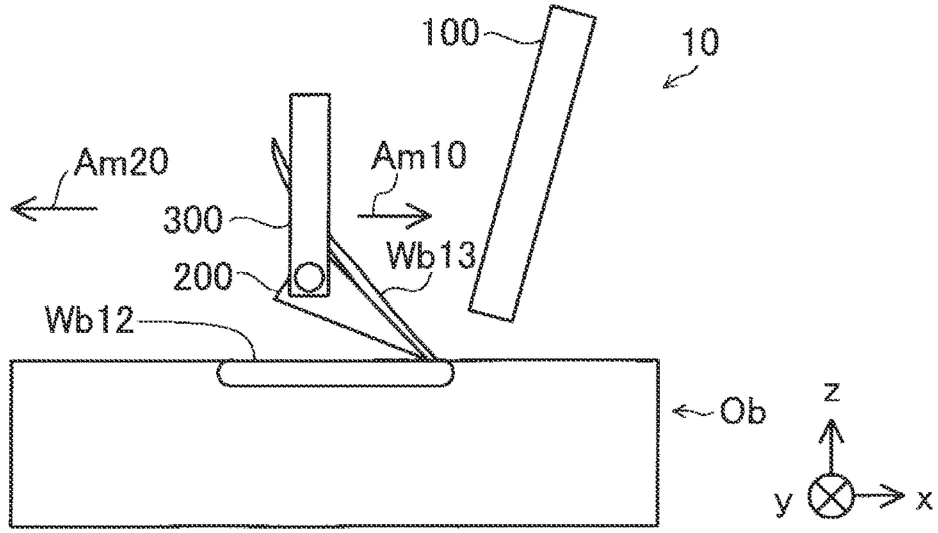
FIG. 8 is an explanatory diagram showing the end of welding by the welding rod 100.

FIG. 8 is an explanatory diagram showing the end of welding by the welding rod 100. The controller of the welding robot terminates the welding by stopping the arc discharge Ar. Therefore, generation of a new molten pool Wb10 is stopped. The scraper 200 continues moving in the moving direction Am10 of the welding rod 100 while the molten pool Wb10 is being melted. Therefore, the scraper 200 continues to move to the position where the welding rod 100 stops welding, thereby removing the removed material Wb13 in the remaining molten pool Wb10. The scraper 200 finishes removing the bead because no new molten pool Wb10 is generated.

Figure 9:
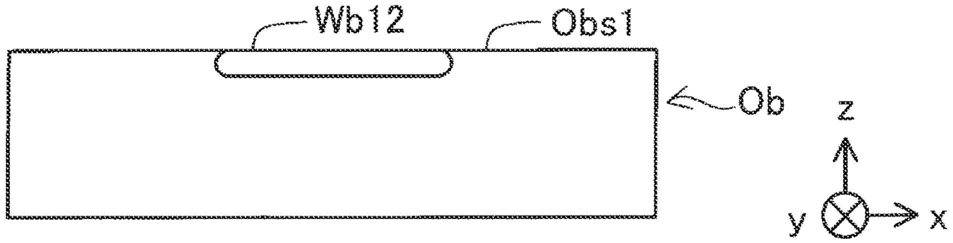
FIG. 9 is an explanatory diagram showing the base material Ob from which beads have been removed.

FIG. 9 is an explanatory diagram showing the base material Ob from which beads have been removed. The bead removal by the scraper 200 leaves a molten pool Wb12 in which the removal material Wb13 is removed from the molten pool Wb10 in the base material Ob. Therefore, after solidification of the molten pool Wb12, the base material Ob is in a state without elevated beads.

By adopting such an aspect, the bead removing method of the present disclosure can shorten the cycle time compared to the aspect of removing the elevated portion Wb11 after the bead cools down. Further, the bead removing method of the present disclosure can remove the removed material Wb13 from the base material Ob without rotating the cutting tool. Therefore, the bead removing method of the present disclosure can remove the object to be removed Wb13 separated from the base material Ob without scattering. Therefore, the bead removing method of the present disclosure makes it easier to collect the removed material Wb13 by discharging it to the rear Am20 of the scraper 200 compared to the case where the removed material Wb13 scatters around. Moreover, the bead removal method of the present disclosure can solidify the molten material Wb13 on the scraper. That is, the bead removing method of the present disclosure can collect the removed material Wb13 at a lower temperature than the molten removed material Wb13. Therefore, the bead removing method of the present disclosure can be easily collected without temperature restrictions as compared with the case of collecting the molten removed material Wb13. Furthermore, in the bead removing method of the present disclosure, the scraper 200 and the removed material Wb13 are less likely to adhere to each other because the removed material Wb13 is removed at a higher temperature than when the solidified material Wb13 is recovered. That is, the bead removing method of the present disclosure can reduce welding prevention work.

B. Second Embodiment

Figure 10:
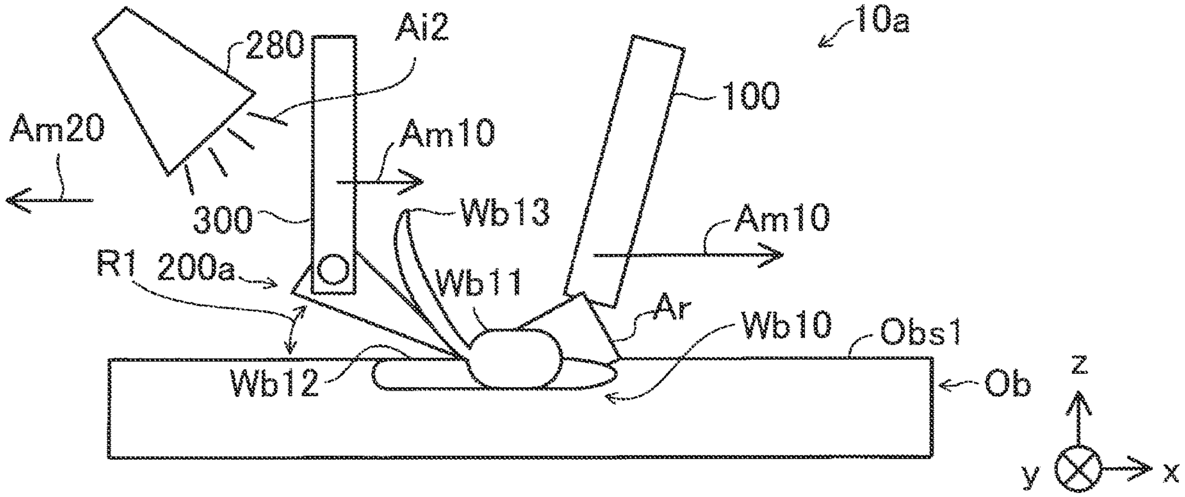
FIG. 10 is an explanatory diagram showing the device configuration of the device 10*a* provided with the scraper 200*a;*

FIG. 10 is an explanatory diagram showing the device configuration of the device 10*a* configured by the scraper 200*a* provided with the recovery unit 280. In the second embodiment, the scraper 200*a* includes a recovery unit 280 that recovers the removed material Wb13 behind the second surface 220*s* Am20. In the scraper 200*a*, the surface opposite to the first surface 210*s* is composed only of the second surface 220*s*. The details of the second surface 220*s* will be described later. Other points of the device 10*a* are the same as the device 10 of the first embodiment.

The recovery unit 280 collects the removed material Wb13 removed by the scraper 200*a*. For example, the recovery unit 280 is a suction machine using a vacuum pump. The recovery unit 280 collects the removed material Wb13 by sucking it from the rear Am20 of the second surface 220*s*. Furthermore, the recovery unit 280 cools the removed material Wb13 by causing the air Ai2 to flow by suction. The recovery unit 280 can connect a nozzle part serving as a suction inlet to the scraper 200*a*. For example, the recovery unit 280 is connected to the connection portions

310 of the scraper 200*a* and the support portion 300. In order to facilitate understanding of the technology, FIG. 10 shows only the nozzle section of the recovery unit 280. The scraper 200*a* is composed only of the second surface 220*s* on the surface opposite to the first surface 210*s*. Therefore, the recovery unit 280 collects the removed material Wb13 from the rear Am20 of the second surface 220*s*. In addition, the fourth surfaces 240*s* are positioned as a pair of surfaces located on both sides of the first surface 210*s* and the second surface 220*s*.

Figure 11:
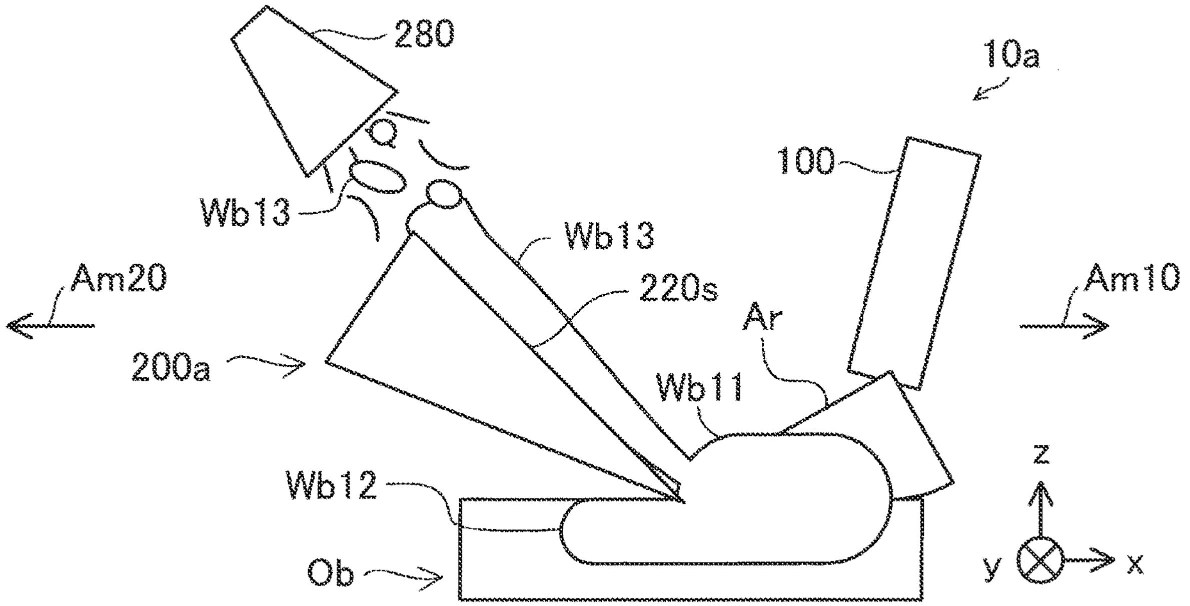
FIG. 11 is an explanatory diagram showing recovery of the removed material Wb13 by the recovery unit 280.

FIG. 11 is an explanatory diagram showing the recovery of the removed material Wb13 by the recovery unit 280. The recovery unit 280 performs suction from the rear Am20 of the second surface 220*s* while removing the bead. The removed material Wb13 discharged to the rear Am20 of the second surface 220*s* is collected by being sucked by the recovery unit 280. The movement of the removed material Wb13 by the suction of the recovery unit 280 is not a relative movement from the scraper 200. The object to be removed Wb13 moves to the recovery unit 280 by being sucked by the recovery unit 280 and receiving a force directed toward the rear Am20.

Figure 12:
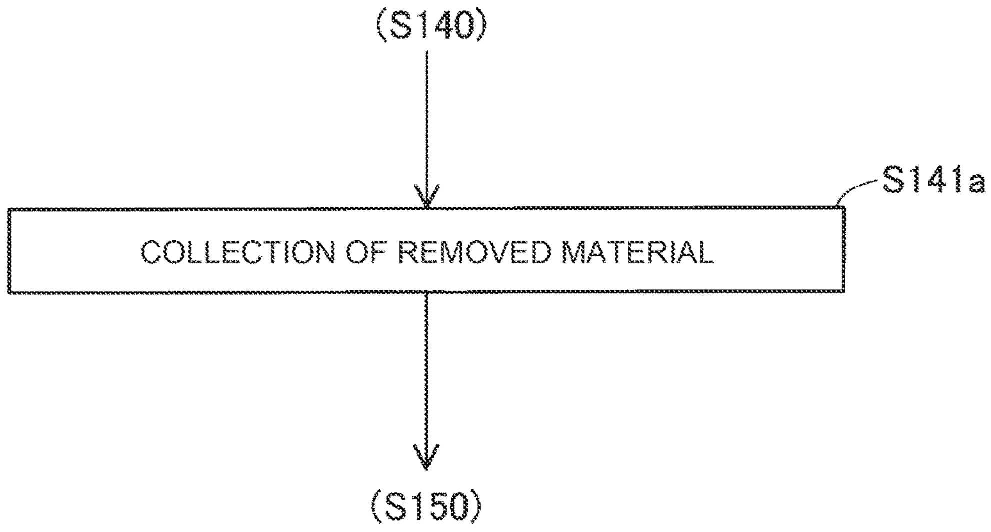
FIG. 12 is a flowchart showing the process of collecting the removed material Wb13 by the recovery unit 280.

FIG. 12 is a flowchart showing the process of collecting the removed material Wb13 by the recovery unit 280. S141*a* is a process following S140 in FIG. 5. The recovery unit 280 performs suction from the rear Am20 of the scraper 200*a* while removing the bead. Therefore, the recovery unit 280 collects the removed material Wb13 discharged behind the scraper 200*a*. Proceeding to S150 in FIG. 5, when the welding is completed, the recovery unit 280 ends this process because the removed material Wb13 is no longer discharged.

By adopting such a mode, the bead removing method by the device 10*a* can collect the removed material Wb13 by the recovery unit 280 provided in the scraper 200*a*, so that the risk of the removed material Wb13 dropping onto the base material Ob can be reduced.

C. Third Embodiment

Figure 13:
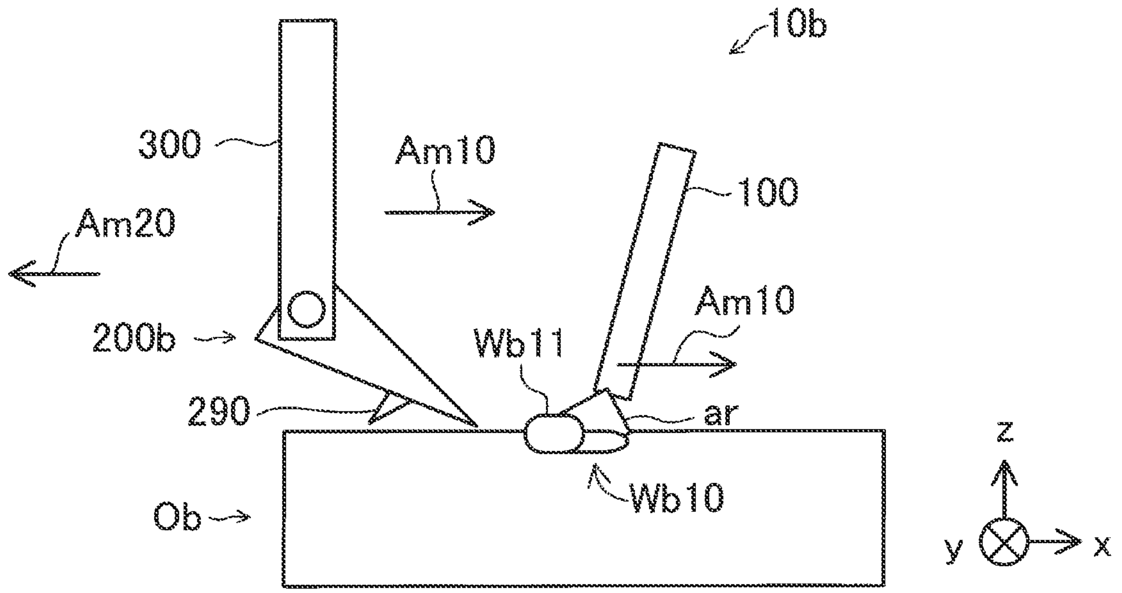
FIG. 13 is an explanatory diagram showing the device configuration of the device 10*b* provided with the scraper 200*b;*

FIG. 13 is an explanatory diagram showing the device configuration of the device 10*b* configured by the scraper 200*b* having the projecting portion 290. In the third embodiment, the scraper 200*b* has a projecting portion 290 projecting from the first surface 210*s*. Other points of the device 10*b* are the same as the device 10 of the first embodiment.

Figure 14:
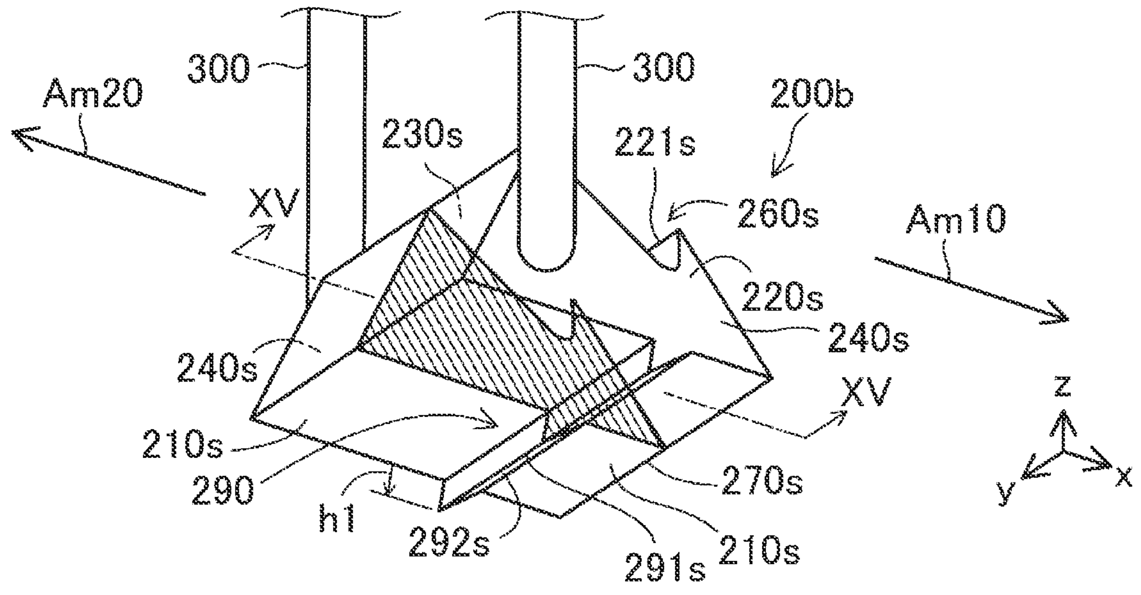
FIG. 14 is an explanatory diagram showing the projecting portion 290 of the scraper 200*b;*

FIG. 14 is an explanatory diagram showing the projecting portion 290 of the scraper 200*b*. The projecting portion 290 smoothes the irregularities on the surface of the molten pool Wb12 from which the removed material Wb13 is separated. This is done by bringing the tip 291*s* of the projecting portion 290 into contact with the surface Obs1 of the base material Ob. A projecting portion 290 projecting from the first surface 210*s* is formed from one of the two fourth surfaces 240*s* toward the other fourth surface 240*s*. That is, the projecting portion 290 is formed so as to cross the moving direction Am10 of the scraper 200. Furthermore, the tip 291*s* of the projecting portion 290 is formed to extend from the front Am10 toward the rear Am20 when the scraper 200 moves. More specifically, in a cross section perpendicular to the y-axis, the cross-sectional shape of the projecting portion 290 is triangular. Therefore, when the scraper 200 moves, the fifth surface 292*s* of the projecting portion 290 facing forward Am10 is inclined in the +z direction from backward Am20 to forward Am10. In addition, the tip 291*s* has a constant height h1 from the first surface 210*s* to the tip 291*s*. The height h1 is designed to reach the surface Obs1 of the base material Ob when the bead is removed.

Figure 15:
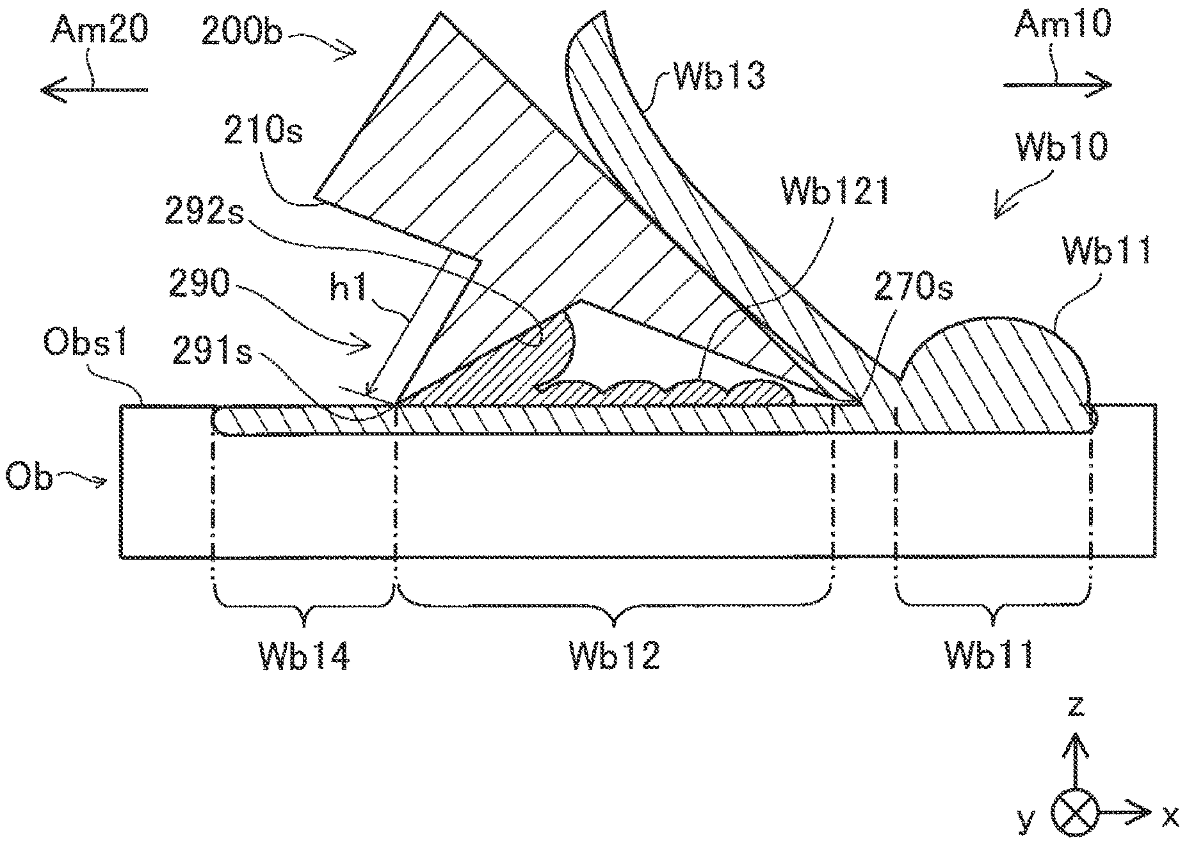
FIG. 15 is an explanatory diagram showing the relationship between the projecting portion 290 and the molten pool Wb10.

FIG. 15 is an explanatory diagram showing the relationship between the projecting portion 290 and the molten pool Wb10. FIG. 15 shows a cross section of the scraper 200*b* and the molten pool Wb10 located on the XV-XV cross section in FIG. 14. In order to facilitate understanding of the technology, illustration of the step 260*s* is omitted. FIG. 15 shows the molten material Wb121 on the surface of the molten pool Wb12. The molten material Wb121 will be described later. The scraper 200 brings the tip 291*s* of the projecting portion 290 into contact with the surface Obs1 of the base material Ob during movement. Therefore, the height h1 from the first surface 210*s* to the tip 291*s* is designed to be the height to the surface Obs1 of the base material Ob at this time.

Figure 16:
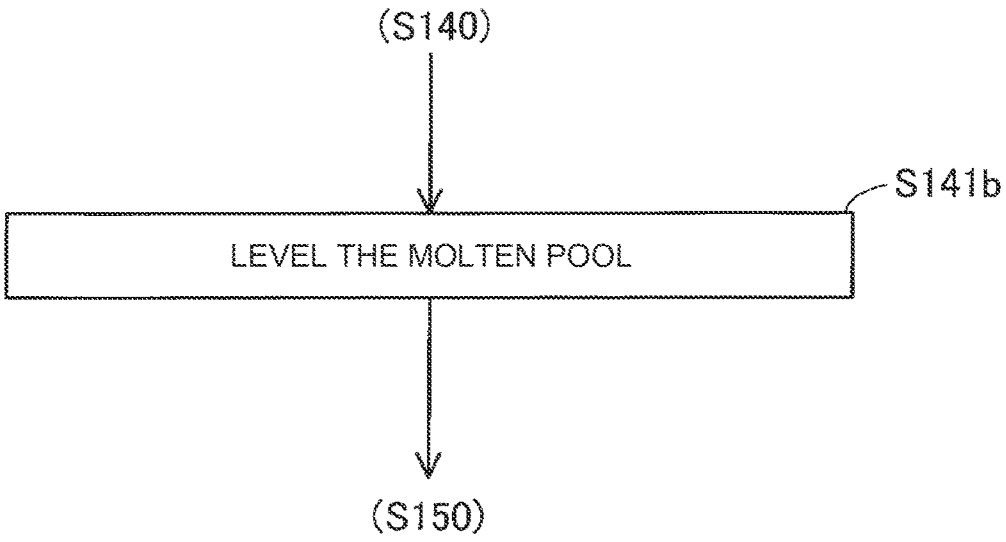
FIG. 16 is a flowchart showing the process of leveling the molten pool Wb12 by the projecting portion 290.

FIG. 16 is a flowchart showing the process of leveling the molten pool Wb12 by the projecting portion 290. S141*b* in FIG. 16 is a process following S140 in FIG. 5. As shown in FIG. 15, the projecting portion 290 smooths out unevenness on the surface of the molten pool Wb12 from which the removal material Wb13 has been removed from the elevated portion Wb11. This unevenness is the melt Wb121.

In S140 of FIG. 5, the scraper 200 removes the object to be removed Wb13 by applying a force in the +z direction to the object to be removed Wb13. Therefore, the scraper 200 does not apply force in the −z direction to the elevated portion Wb11. Therefore, when a gap is generated between the front end 270*s* and the surface Obs1 of the base material Ob, the unremoved molten material Wb121 remains on the surface of the molten pool Wb12. This gap is generated when the front end 270*s* separates from the surface Obs1 due to shaking of the scraper 200 during movement and resistance due to molten material during removal.

In S141*b* of FIG. 16, the movement of the scraper 200 causes the projecting portion 290 to reach the molten material Wb121 as shown in FIG. 15. Projecting portion 290 suppresses melt Wb121 from moving rearward Am20 from projecting portion 290 by tip 291*s*. Therefore, the projecting portion 290 moves the molten material Wb121 along the fifth surface 292*s*. The fifth surface 292*s* is inclined in the +z direction from the rear Am20 toward the front Am10 when the scraper 200 moves. Therefore, the projecting portion 290 moves forward Am10 to apply a force in the −z direction to the molten material Wb121 in contact with the fifth surface 292*s*. That is, the projecting portion 290 applies pressure to the molten material Wb121 to form a molten pool Wb14 that smoothes the irregularities of the molten pool Wb12. The process proceeds to S150 in FIG. 5, and when the welding is completed, the process ends to finish leveling the remaining molten pool Wb12.

By adopting such an aspect, the bead removing method by the device 10*b* can reduce the surface roughness of the bead after bead removal.

D. Fourth Embodiment

Figure 17:
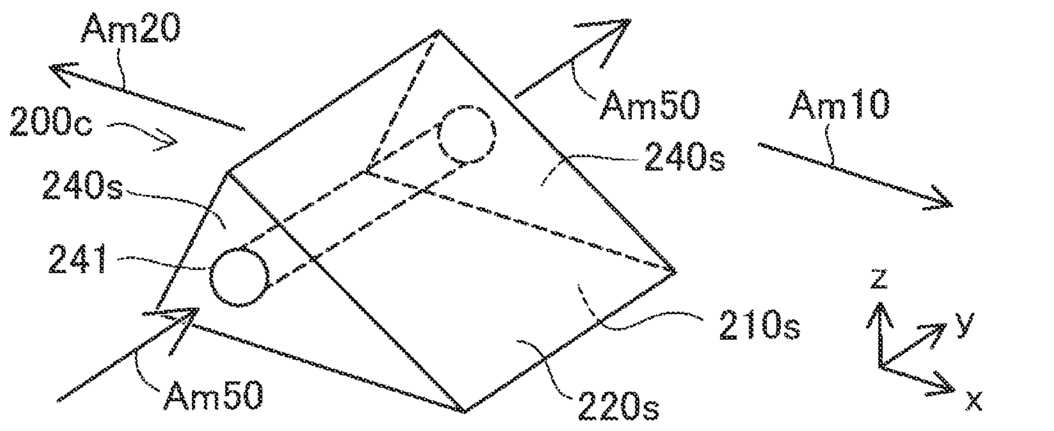
FIG. 17 is an explanatory diagram showing the cooling path 241.

FIG. 17 is an explanatory diagram showing a scraper 200*c* with cooling passages 241. In FIG. 17, the illustration of the support portion 300 is omitted for easy understanding of the technology. In the above embodiment, the scraper 200 causes the air Ai1 to flow over the step 260*s*, thereby solidifying the removal material Wb13. However, solidification of the removal material Wb13 is not necessarily limited to this form. Solidification of the removed material Wb13 may be realized by providing a form different from the step 260*s*. Further, solidification of the removed material Wb13 may be realized by providing both the step 260*s* and another form. For example, a fourth embodiment with a scraper 200*c* shown in FIG. 17 is illustrated. The scraper 200*c* has a through hole connecting the two fourth surfaces 240*s*. This through hole is called a cooling path 241. The scraper 200*c* does not have a step 260*s*. Therefore, the surface opposite to the first surface 210*s* is composed only of the second surface 220*s*. Other points of the device 10*c* constituted by the scraper 200*c* are the same as the device 10 of the first embodiment.

The cooling path 241 cools the scraper 200 with coolant. More specifically, the cooling path 241 causes the coolant to flow inside the cooling path 241 by injecting the coolant from one of the two openings of the through hole toward the other. For example, in FIG. 17, the coolant passes through the cooling path 241 by flowing in the direction of arrow Am50, which is the +y direction. The cooling path 241 cools the scraper 200 by exchanging heat between the coolant and the scraper 200. That is, the removal material Wb13 is cooled through the scraper 200 and solidified.

E. Fifth Embodiment

Figure 18:
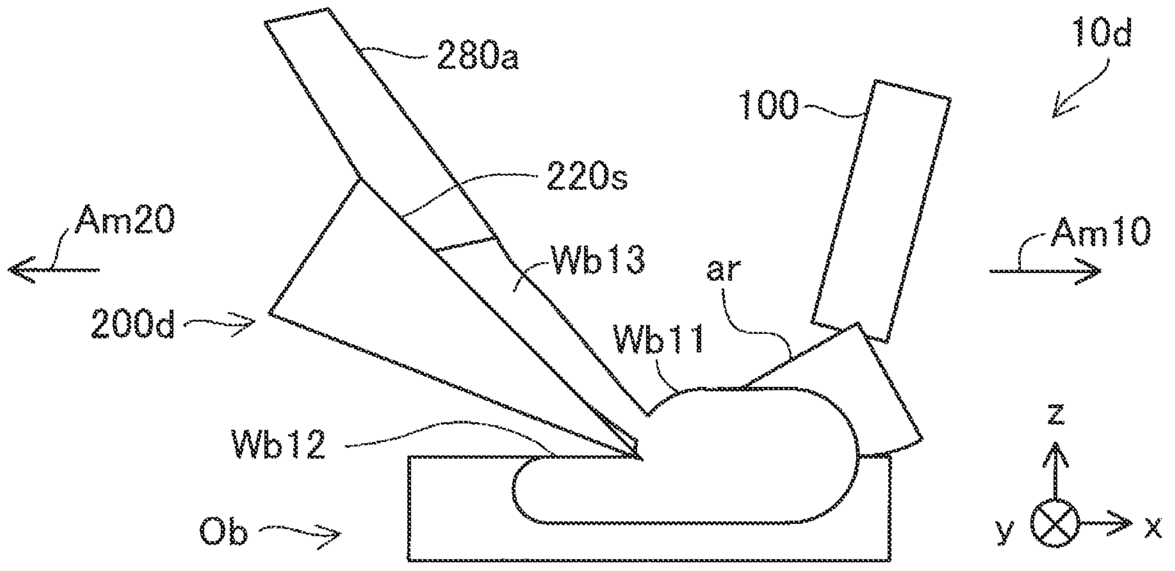
FIG. 18 is an explanatory diagram showing the configuration of a device 10*d* having a scraper 200*d;*

FIG. 18 is an explanatory diagram showing the device configuration of a device 10*d* configured by a scraper 200*d* having a recovery unit 280*a*. In FIG. 18, illustration of the support portion 300 is omitted for easy understanding of the technology. In the above-described second embodiment, the scraper 200*a* collects the removal material Wb13 discharged from the rear Am20 of the second surface 220*s* by the recovery unit 280. However, the recovery of the removed material Wb13 is not necessarily limited to this form. For example, the fifth embodiment is exemplified as a recovery unit 280*a* shown in FIG. 18. The recovery unit 280*a* is configured by bundling a plurality of thread-like members. The recovery unit 280*a* recovers the removed material Wb13 in a melted state. Other points of the device 10*d* constituted by the scraper 200*d* are the same as the device 10*a* of the second embodiment.

The recovery unit 280*a* recovers the molten removed material Wb13 by capillary action. More specifically, the recovery unit 280*a* brings the bundle of tubes into contact with the removed material Wb13 in a molten state, thereby adsorbing the removed material Wb13 that has entered between the tubes by capillary action. The recovery unit 280*a* is made of a material having a melting point Tm3. For example, the recovery unit 280*a* is a bundle of tungsten wires. The thickness and the number of tungsten wires are determined experimentally using the removed material Wb13 in a molten state. Since the scraper 200*d* does not have the step 260*s*, the molten material to be removed Wb13 flows along the second surface 220*s*. As shown in FIG. 18, the recovery unit 280*a* is arranged on the second surface 220*s* in the flow path of the removed material Wb13. With such a configuration, the recovery unit 280*a* contacts the removed material Wb13 flowing on the second surface 220*s* of the scraper 200*d*, and collects the removed material Wb13 by being adsorbed by capillary action.

F. Sixth Embodiment

Figure 19:
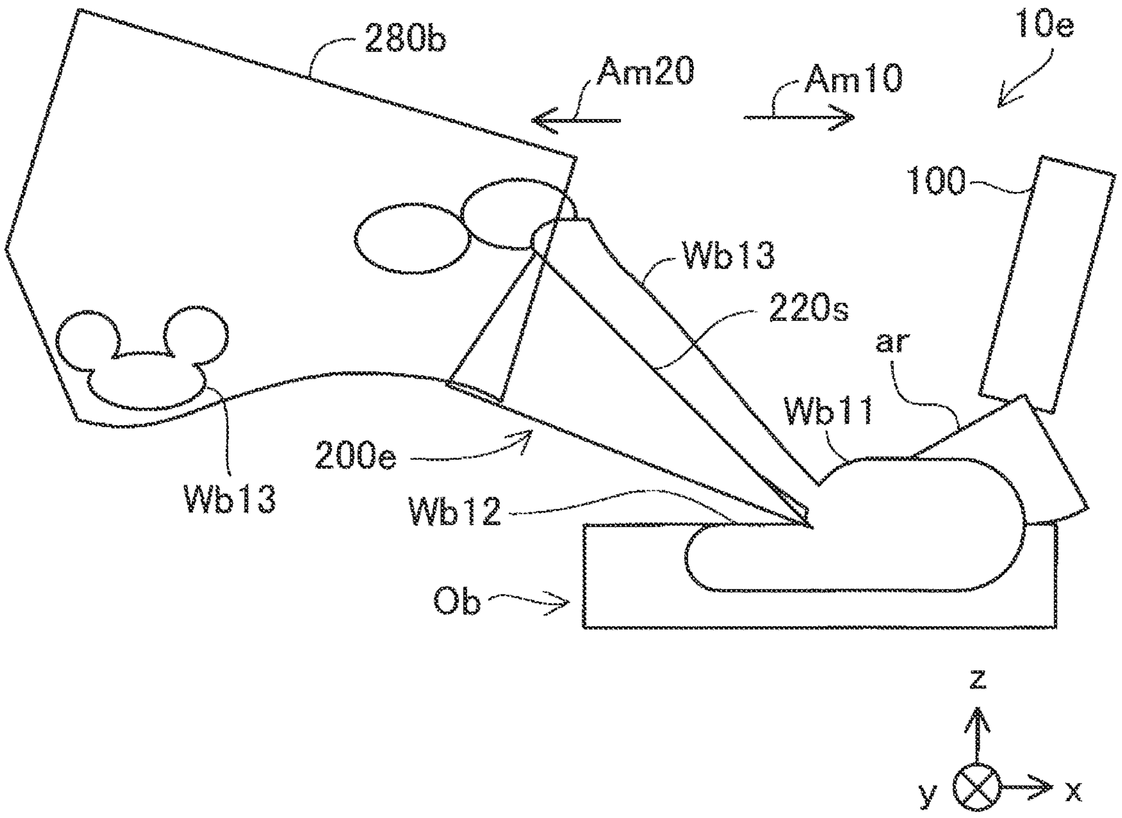
FIG. 19 is an explanatory diagram showing the device configuration of the device 10*e* provided with the scraper 200*e*.

FIG. 19 is an explanatory diagram showing the device configuration of a device 10*e* configured by a scraper 200*e* having a recovery unit 280*b*. In FIG. 19, the illustration of the support portion 300 is omitted for easy understanding of the technology. FIG. 19 shows a sixth mode of collecting the removed material Wb13. The recovery unit 280*b* is a container that stores the removed material Wb13. The scraper 200*e* does not have a step 260*s* because the scraper 200*e* can also collect the molten removed material Wb13 by the recovery unit 280*b*. Therefore, the surface opposite to the first surface 210*s* is composed only of the second surface 220*s*. Other points of the device 10*e* configured by the scraper 200*e* are the same as the device 10*a* of the second embodiment.

The recovery unit 280*b* collects the removed material Wb13 removed by the scraper 200*e*. More specifically, the recovery unit 280*b* can store the removed material Wb13 inside the recovery unit 280*b*. The recovery unit 280*b* is made of a material having a melting point Tm3. For example, the recovery unit 280*b* is a container made of tungsten. The recovery unit 280*b* is arranged behind the scraper 200*e* of the removed material Wb13 Am20. The recovery unit 280*b* is connected to the rear of the second surface 220*s* so as to be connected to the flow path of the removed material Wb13. By adopting such a mode, the recovery unit 280*b* can recover the removed material Wb13 discharged from the second surface 220*s*.

G. Seventh Embodiment

Figure 20:
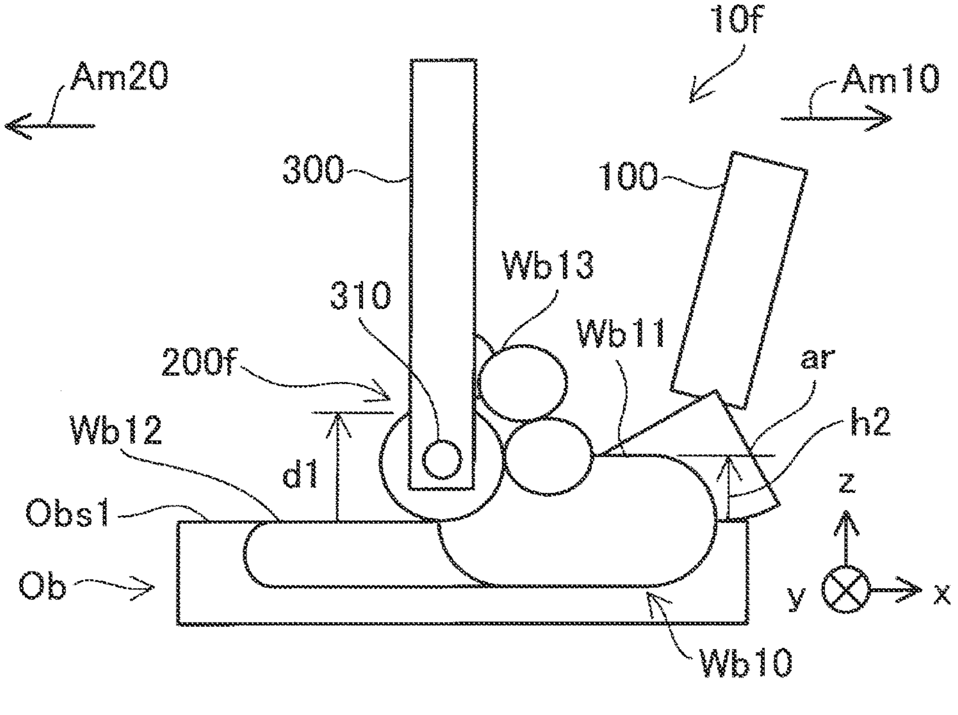
FIG. 20 is an explanatory diagram showing the configuration of a device 10*f* having a scraper 200*f.*

FIG. 20 is an explanatory diagram showing the device configuration of the device 10*f* composed of the scraper 200*f*. The shape of the scraper 200*f* is filamentous. For example, scraper 200*f* is a tungsten wire. Therefore, the melting point Tm3 of the scraper 200*f* is approximately 3387° C. because the scraper 200*f* is made of tungsten. Furthermore, the diameter d1 of this tungsten wire is smaller than the height h2 from the surface Obs1 of the base material Ob at the elevated portion Wb11. FIG. 20 shows the diameter d1 larger than the height h2 in order to facilitate understanding of the scraper 200*f*. The scraper 200*f* is supported by connecting both ends of the thread-like main body to the connection portions 310 of the support portion 300 in the first embodiment. Other points of the device 10*f* constituted by the scraper 200*f* are the same as the device 10 of the second embodiment.

By adopting such an aspect, the body of the scraper 200*f* can be placed between the object to be removed Wb13 and the surface Obs1. Therefore, the scraper 200*f* separates the removed material Wb13 from the base material Ob while the molten pool Wb10 is being melted. Furthermore, the scraper 200*f* can discharge the removed material Wb13 beyond its main body backward. Therefore, in the seventh embodiment, the material to be removed Wb13 separated from the base material Ob can be removed without scattering. Therefore, in the seventh embodiment, compared with the case where the removed substances Wb13 scatter around, the removed substances Wb13 are discharged to the rear Am20 of the scraper 200*f*, thereby facilitating the collection of the removed substances Wb13.

H. Other Embodiments

In the above embodiment, the welding for generating the molten pool Wb10 is consumable electrode welding. However, the welding may be non-consumable electrode welding. For example, laser welding may be used. In the case of laser welding, the molten pool Wb10 is generated by a filler rod and a laser beam from a laser scanner. More specifically, the laser scanner heats the base material Ob and the filler rod, which has a melting point Tm2, to a temperature Tm4 by irradiating the base material Ob and the filler rod with a laser beam. Therefore, the laser scanner generates a molten pool Wb10 in which the base material Ob and the filler rod are fused together. The filler rod is, for example, aluminum alloy A5183 in JISZ3232. The filler rod is moved along with the movement of the laser beam by the robot arm. The scraper 200 achieves bead removal in the same manner as the device 10 by connecting the support portion 300 to the robot arm.

In the above embodiment, the melting point Tm1 of the base material Ob and the melting point Tm2 of the welding rod 100 are approximately 660° C. because aluminum is used as the raw material. The scraper 200 has a melting point Tm3 of about 3387° C. because it is made of tungsten. A heating temperature Tm4 for arc welding is about 2500° C. However, each temperature is not limited to this condition. The melting point Tm3 of the scraper 200 should be higher than the melting point Tm1 of the base material Ob and the melting point Tm2 of the welding rod 100. The temperature Tm4 of heating by arc welding may be a temperature lower than the melting point Tm3 of the scraper 200. For example, the following configuration can be exemplified. The base material Ob is mild steel having a melting point Tm1 of about 1500° C. Welding rod 100 is a lime titania based welding rod in accordance with JISZ3211E4303. The melting point Tm2 of this welding rod 100 is about 1500° C. The scraper 200 is ceramic with a melting point Tm3 of about 2700° C. A heating temperature Tm4 for arc welding is about 2000° C.

In the above embodiment, the projecting portion 290 is a component of the scraper 200*b* of the third embodiment. However, the projecting portion 290 may be included in scraper components in other embodiments than the seventh embodiment. For example, the scraper 200*a* of the second embodiment may have both the recovery unit 280 and the projecting portion 290.

In the second embodiment, the scraper 200*a* having the recovery unit 280 may have the step 260*s* in the first embodiment.

In the third embodiment, the scraper 200*b* having the projecting portion 290 may include a recovery unit for collecting the removed material Wb13 in other embodiments. For example, the scraper 200*b* may comprise the recovery unit 280 of the second embodiment.

In the fourth embodiment, the scraper 200*c* provided with the cooling path 241 may be provided with a recovery unit that collects the removed material Wb13 in other embodiments. For example, the scraper 200*c* may comprise the recovery unit 280 of the second embodiment.

In the sixth embodiment described above, the scraper 200*e* provided with the recovery unit 280*b* may be provided with the step 260*s* in other embodiments. In this case, the recovery unit 280*b* is connected behind the third surface 230*s* so as to be connected to the flow path of the removed material Wb13.

In the seventh embodiment, the scraper 200*f*, which is a thread-like main body, may include the recovery unit 280 of the second embodiment or the recovery unit 280*b* of the sixth embodiment. In this case, the scraper 200*f* can collect the removed material Wb13 by connecting the recovery unit 280 or the recovery unit 280*b* to the connection portions 310.

The above embodiments can be used for a variety of manufacturing applications that require weld bead removal. As an example, the above embodiments may be used for the manufacture of batteries. More specifically, the above-described embodiment can prevent interference between parts due to beads by using it for manufacturing a battery case.

The present disclosure is not limited to the embodiments described above, and can be implemented in various configurations without departing from the scope of the present disclosure. For example, the technical features of the embodiments corresponding to the technical features in each form described in the outline of the disclosure can be replaced or combined as appropriate in order to solve some or all of the above-described problems or achieve some or all of the above-described effects. Also, if the technical features are not described as essential in this specification, they can be deleted as appropriate.

What is claimed is:

1. A removal method of a weld bead, the removal method comprising the steps of:

(a) preparing a scraper made of a material with a melting point that is higher than a melting point of a base material that is an object of welding and a melting point of a welding rod;

(b) creating a molten pool in which the base material and the welding rod are fused together, by heating the base material and the welding rod at a temperature lower than the melting point of the scraper;

(c) separating at least a portion of material making up an elevated portion by the scraper, by moving the scraper to the elevated portion of the bead that is raised from the molten pool above a surface of the base material while the molten pool is molten; and (d) discharging the at least a portion of the material rearward, in a direction opposite to forward that is a direction of movement of the scraper in the step (c), by causing the at least a portion of the material to move along a second face of the scraper on a side opposite to a first face facing the base material, wherein:

the scraper further includes a third face disposed on the opposite side to the first face;

a rearward edge of the second face is disposed upward and rearward as compared to a forward edge of the third face, in an attitude of the scraper at a time of the movement; and the step (d) further includes solidifying the at least a portion of the material that flows over the scraper by the movement of the scraper, in an area that is rearward of the rearward edge of the second face, and upward from the third face.

2. The removal method according to claim 1, further comprising (e) recovering the at least a portion of the material as discharged removed material, following the step (d), by a recovery unit that the scraper includes and is provided rearward of the second face, to recover the removed material that is removed by the scraper.

3. The removal method according to claim 1, wherein:

the scraper includes a protrusion that protrudes from the first face; and the step (c) includes leveling unevenness on a surface of the molten pool from which the material is separated, by abutting a distal end of the protrusion against the surface of the base material.

4. The removal method according to claim 1, wherein the welding is welding for manufacturing a battery.

* * * * *